(12) United States Patent
Ozaki et al.

(10) Patent No.: US 10,083,153 B2
(45) Date of Patent: Sep. 25, 2018

(54) ARITHMETIC PROCESSING APPARATUS

(71) Applicant: DENSO CORPORATION, Kariya, Aichi-pref. (JP)

(72) Inventors: Tomoaki Ozaki, Anjo (JP); Kenichi Minoya, Kariya (JP)

(73) Assignee: DENSO CORPORATION, Kariya (JP)

( * ) Notice: Subject to any disclaimer, the term of this patent is extended or adjusted under 35 U.S.C. 154(b) by 414 days.

(21) Appl. No.: 14/673,962

(22) Filed: Mar. 31, 2015

(65) Prior Publication Data

US 2015/0309961 A1  Oct. 29, 2015

(30) Foreign Application Priority Data

Apr. 28, 2014 (JP) .................... 2014-92665

(51) Int. Cl.
*G06F 17/10* (2006.01)
*G06N 3/04* (2006.01)
*G06F 17/15* (2006.01)

(52) U.S. Cl.
CPC .............. *G06F 17/10* (2013.01); *G06F 17/15* (2013.01); *G06N 3/04* (2013.01)

(58) Field of Classification Search
None
See application file for complete search history.

(56) References Cited

U.S. PATENT DOCUMENTS

| 2002/0038294 | A1 | 3/2002 | Matsugu |
| 2010/0223219 | A1 | 9/2010 | Kato et al. |
| 2011/0239032 | A1 | 9/2011 | Kato et al. |
| 2014/0169631 | A1 | 6/2014 | Mizuno et al. |
| 2014/0337262 | A1 | 11/2014 | Kato et al. |

OTHER PUBLICATIONS

Takayuki Okatani et al., "Deep Learning", IEICE Technical Report-Multimedia and Virtual Environment, Jan. 16, 2013, vol. 112, No. 386, pp. 111-127 (and English translation).

*Primary Examiner* — Kakali Chaki
*Assistant Examiner* — Michael Zidanic
(74) *Attorney, Agent, or Firm* — Posz Law Group, PLC

(57) ABSTRACT

An arithmetic processing apparatus performs arithmetic by a neural network in which multiple processing layers are hierarchically connected. The arithmetic processing apparatus corresponding to one of the multiple processing layers includes a convolution arithmetic portion and a pooling processing portion. The convolution arithmetic portion receives an input data from another of the plurality of processing layers, performs convolution arithmetic to the input data, and in each arithmetic cycle, outputs a part of all convolution arithmetic result data required for single pooling processing. The pooling processing portion performs the single pooling processing to the all convolution arithmetic result data before executing activation processing.

8 Claims, 12 Drawing Sheets

FIG. 3

| PROCESSING TYPE | FUNCTION NAME | FUNCTION EXP |
|---|---|---|
| CONVOLUTION ARITHMETIC | CONVOLUTION FUNCTION | $y_j = b_j + \sum_{i=1}^{m} y_i w_{ij}$ $(i = 1, \ldots, m)$ |
| ACTIVATION | LOGISTIC SIGMOID | $f(y_j) = \dfrac{1}{1 + e^{-y_j}}$ |
| ACTIVATION | Rectified-Liner-Units (ReLU) | $f(y_j) = \max(y_j, 0)$ |
| POOLING | MAX POOLING | $h' = \max_j h_j$ |
| POOLING | AVERAGE POOLING | $h' = \dfrac{1}{N} \sum_j h_j$ |

FIG. 7

| ARITHMETIC CYCLE | 1 | 2 | 3 | 4 | 5 | ... |
|---|---|---|---|---|---|---|
| SYSTOLIC (A) | C(1,1) | C(2,1) | C(3,1) | C(4,1) | C(1,3) | ... |
| SYSTOLIC (B) | C(1,2) | C(2,2) | C(3,2) | C(4,2) | C(1,4) | ... |
| 1ST COMP | MAX(C(1,1),C(1,2))⇒M11 | MAX(C(2,1),C(2,2))⇒M21 | MAX(C(3,1),C(3,2))⇒M31 | MAX(C(4,1),C(4,2))⇒M41 | MAX(C(1,3),C(1,4))⇒M13 | ... |
| MEMORY | | M11 | | M31 | | ... |
| 2ND COMP | | MAX(M11,M21)⇒P11 | | MAX(M31,M41)⇒P31 | | ... |
| ACTIVATION | | | P11 | | P31 | ... |

ARITHMETIC PROCESSING APPARATUS

CROSS REFERENCE TO RELATED APPLICATION

This application is based on Japanese Patent Application No. 2014-92665 filed on Apr. 28, 2014, the disclosure of which is incorporated herein by reference.

TECHNICAL FIELD

The present disclosure relates to an arithmetic processing apparatus.

BACKGROUND ART

Patent literature 1: Japanese Patent No. 5184824 (corresponding to US2010/0223219 A1)

Conventionally, an arithmetic processing apparatus performs arithmetic by a neural network in which multiple processing layers are hierarchically connected. Especially, in an arithmetic processing apparatus performing image recognition, a convolutional neural network corresponds to a core technology.

Conventionally, the convolutional neural network executes convolution arithmetic processing to an extracted result data of a feature quantity corresponding to multiple different arithmetic result data that are obtained from a preceding layer, executes activation processing, and executes pooling processing, so that a feature quantity in a higher dimension is extracted. The inventors of the present disclosure have found the following. Since the conventional convolutional neural network obtains all convolution arithmetic result data required for one pooling processing in one arithmetic cycle, convolution arithmetic portions are required according to the number of the required convolution arithmetic result data. In addition, in order to activate all convolution arithmetic result data required for one pooling processing in one arithmetic cycle, multiple activation means according to the number of the required convolution arithmetic result data are also required. An entire circuit size of an arithmetic processing apparatus that realizes arithmetic processing by a convolutional neural network may enlarge.

SUMMARY

It is an object of the present disclosure to provide an arithmetic processing apparatus whose entire circuit size is reduced and that realizes arithmetic processing by a neural network.

According to one aspect of the present disclosure, an arithmetic processing apparatus performs arithmetic by a neural network in which multiple processing layers are hierarchically connected. The arithmetic processing apparatus corresponding to one of the multiple processing layers includes a convolution arithmetic portion and a pooling processing portion. The convolution arithmetic portion receives an input data from another of the multiple processing layers, performs convolution arithmetic to the input data, and in each arithmetic cycle, outputs a part of all convolution arithmetic result data required for single pooling processing. The pooling processing portion performs pooling processing to the all convolution arithmetic result data obtained by the convolution arithmetic portion before executing activation processing.

According to the arithmetic processing apparatus, the number of the convolution arithmetic result data that the convolution arithmetic portion outputs in one arithmetic cycle is reduced. The pooling portion obtains a processing result by the pooling processing before executing the activation processing. It may be possible to reduce a size of the convolution arithmetic portion. Since the processing result by the pooling processing is obtained before executing the activation processing, it may be possible to reduce the number of the activation portions as compared with a conventional technology in which activation processing is performed to multiple data and then, the pooling processing is executed. It may be possible to reduce an entire circuit size of the arithmetic processing apparatus, which realizes the arithmetic processing by the convolutional neural network.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram illustrating general arithmetic and functions used in a feature quantity extraction processing;

FIG. 7 is a diagram illustrating a pipeline processing by the arithmetic processing apparatus;

DETAILED DESCRIPTION

Figure 1:
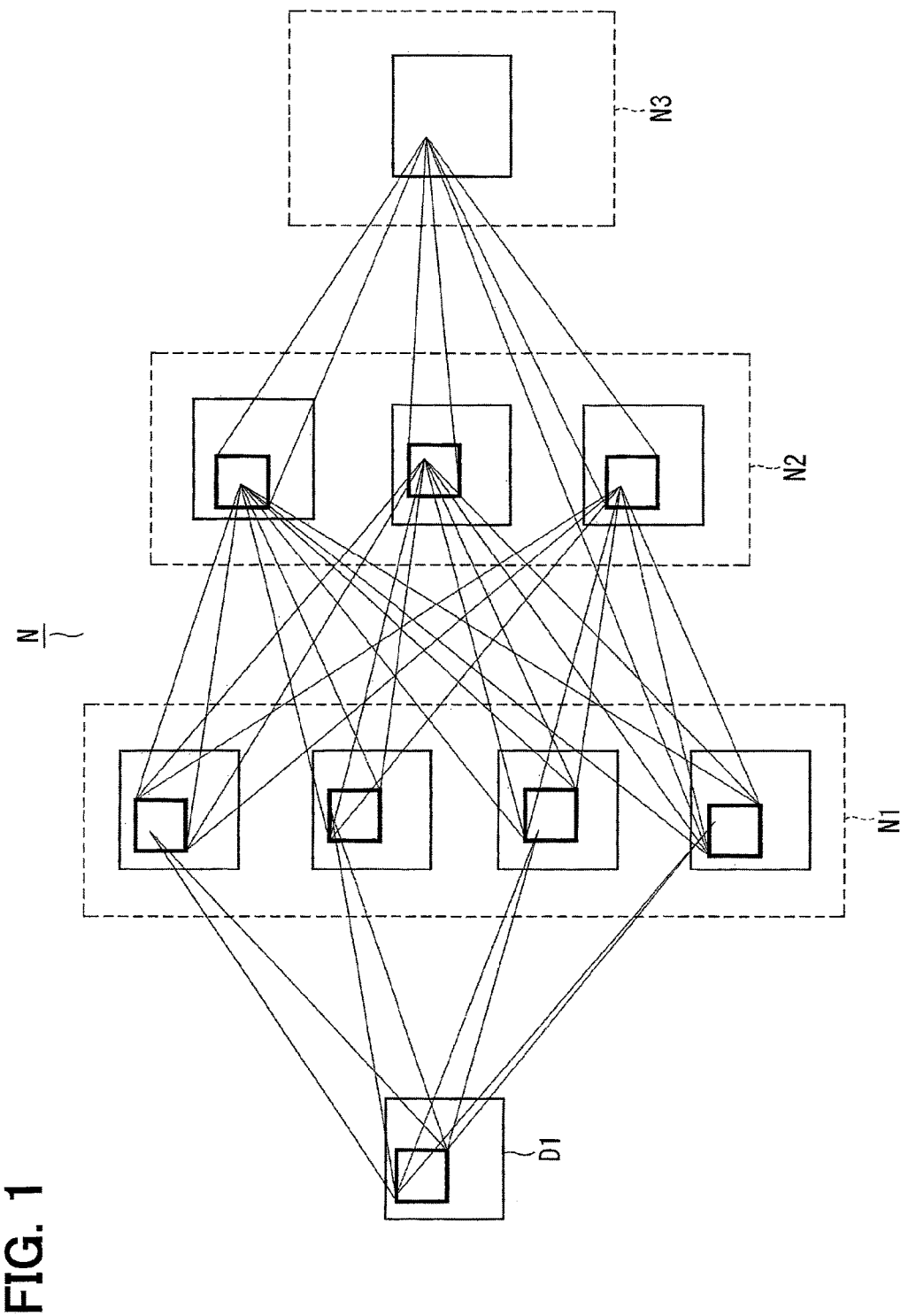
FIG. 1 is a diagram schematically illustrating a configuration example of a convolutional neural network.

In the following, multiple embodiments of an arithmetic processing apparatus will be explained with referring to the drawings. Incidentally, an identical symbol will be given to substantially identical elements in each embodiment and explanation will be omitted.

Neural Network

FIG. 1 schematically illustrates a configuration of a neural network that is applied to arithmetic processing apparatus 100, 200. The neural network corresponds to a convolutional neural network in this case. In a convolutional neural network N, multiple feature quantity extraction processing layers N1, N2, N3 are hierarchically connected. The convolutional neural network N is applied to an image recognition technology in which a predetermined shape or a predetermined pattern is recognized from an image data D1, which is an input data. In the feature quantity extraction processing layer N1 in the first layer, the arithmetic processing apparatus scans the image data D1, which is input, for each predetermined size, for example, by a raster scan. The feature quantity extraction processing layer N1 extracts feature quantity by performing feature quantity extraction processing to the scanned data. The feature quantity extraction processing layer N1 in the first layer extracts a relatively simple and single feature such as a linear feature quantity extending toward a horizontal direction, a linear feature quantity extending toward an oblique direction, or the like.

Incidentally, a preceding processing layer may correspond to a processing layer performing processing and outputting an input data before a specific processing layer receives the input data and performs processing to the input data. In a neural network, multiple processing layers are conceptually arranged.

In the feature quantity extraction processing layer N2 in the second layer, the arithmetic processing apparatus scans an input data, which is input from the feature quantity extraction processing layer N1 being a preceding layer, for each predetermined size, for example, by the raster scan. The feature quantity extraction processing layer N1 extracts a feature quantity by performing feature quantity extraction processing to the scanned data. The feature quantity extraction processing layer N2 in the second layer integrates multiple feature quantity extracted in the feature quantity extraction processing layer N1 in the first layer by considering a spatial relationship of the multiple feature quantity, so that a composite feature quantity with a higher dimension is extracted.

In the feature quantity extraction processing layer N3 in the third layer, the arithmetic processing apparatus scans an input data, which is input from the feature quantity extraction processing layer N2 being a preceding layer, for each predetermined size, for example, by the raster scan. The feature quantity extraction processing layer N3 extracts a feature quantity by performing feature quantity extraction processing to the scanned data. The feature quantity extraction processing layer N3 in the third layer integrates multiple feature quantity extracted in the feature quantity extraction processing layer N2 in the second layer by considering a spatial relationship of the multiple feature quantity extracted in the feature quantity extraction processing layer N2, so that a composite feature quantity with a higher dimension is extracted. Therefore, by repeating extraction processing of feature quantity to the multiple feature quantity processing layers, the arithmetic processing apparatus performs image recognition of a detection object included in the image data D1.

Figure 2:
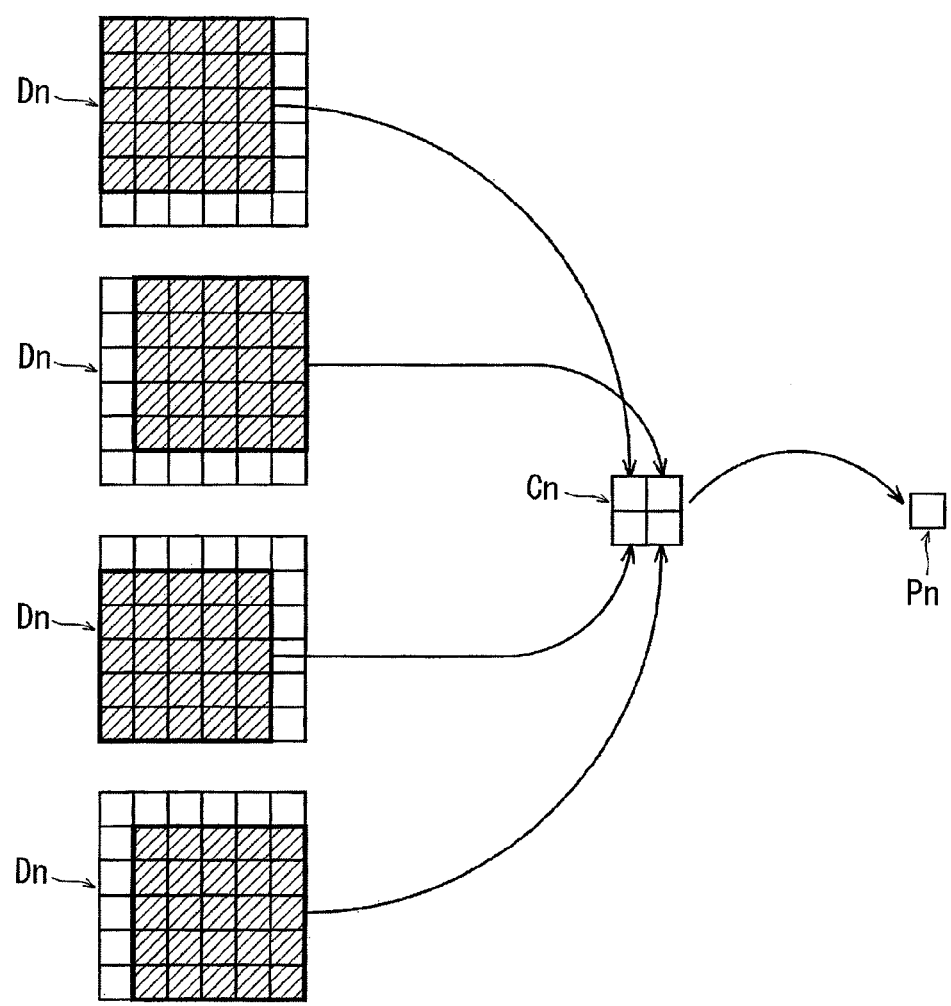
FIG. 2 is a diagram visually illustrating a flow of arithmetic processing by an arithmetic processing apparatus.

FIG. 2 visually illustrates a flow of arithmetic processing by an arithmetic processing apparatus. That is, the arithmetic processing apparatus scans an input data Dn, which is input from a feature quantity extraction processing layer being a preceding layer, for a predetermined size. In this case, the predetermined size corresponds to a 5×5 pixels illustrated by hatching in FIG. 2. The arithmetic processing apparatus performs convolution arithmetic to the scanned data. Then, the arithmetic processing apparatus performs pooling processing for each predetermined size to a data Cn after the convolution arithmetic. In this case, the predetermined size corresponds to 2×2 pixels. Then, the arithmetic processing apparatus outputs a data Pn after the pooling processing to the feature quantity extraction processing layer in a next layer. Incidentally, in each embodiment, the arithmetic processing apparatus is elaborated in order to obtain a processing result corresponding to the pooling processing while performing the convolution arithmetic processing. That is, the arithmetic processing apparatus according to the present disclosure does not clearly separate the convolution arithmetic processing and the pooling processing.

FIG. 3 illustrates a general example of a convolutional function used in convolution arithmetic processing, a function used in activation processing, and a function used in pooling processing. That is, the convolutional function yj adds a predetermined bias value Bj to a sum obtained by multiplying an output yi in an immediate preceding layer by a weight coefficient wij obtained by a learning as described in FIG. 3. The activation processing uses a well-known logistic sigmoid function, a ReLu function (a rectified linear units function), or the like. The pooling processing uses a well-known max pooling function outputting a maximum value of an input data, a well-known average pooling function outputting an average value of the input data, or the like.

First Embodiment

Figure 4:
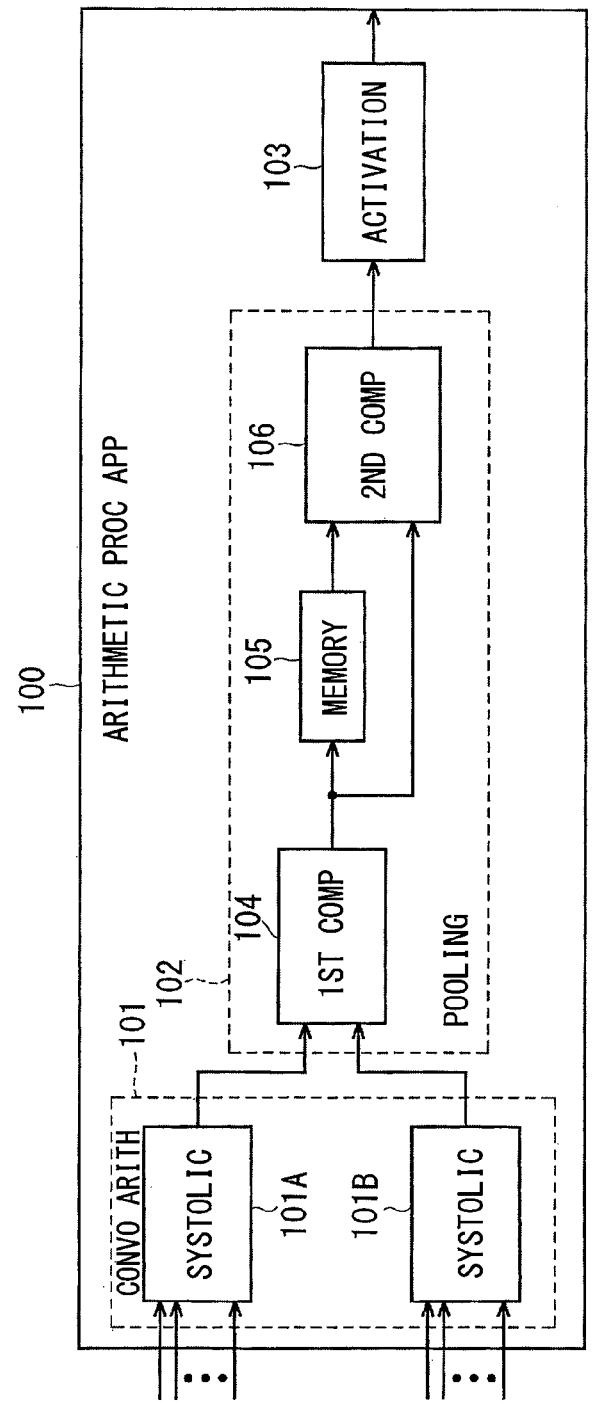
FIG. 4 is a block diagram schematically illustrating a configuration example of an arithmetic processing apparatus in a first embodiment.

An arithmetic processing apparatus 100 exemplified in FIG. 4 includes a convolution arithmetic portion 101, a pooling processing portion 102, an activation processing portion 103, or the like. The pooling processing portion 102 includes a first comparator 104, a memory circuit 105, a second comparator 106, or the like. The convolution arithmetic portion 101 includes multiple systolic arrays 101A, 101B. The systolic arrays 101A, 101B are example of a convolution arithmetic block. The convolution arithmetic portion 101 outputs a part of all convolution arithmetic result data required for a single pooling processing in each one arithmetic cycle. In this case, the convolution arithmetic portion 101 outputs two of the four convolution arithmetic result data in each arithmetic cycle. The four convolution arithmetic result data are required for one pooling processing. Therefore, the convolution arithmetic portion 101 includes two systolic arrays 101A, 101B. Incidentally, the convolution arithmetic result data that the convolution arithmetic portion 101 outputs in one arithmetic cycle (or in a single arithmetic cycle) may corresponds to a convolution arithmetic result data aligned in a perpendicular direction or aligned in a horizontal direction of all convolution arithmetic result data (pixels) required for one pooling processing.

The first comparator 104 outputs data having the largest value of multiple convolution arithmetic result data, which are obtained by one arithmetic cycle, as a max convolution arithmetic result data. In this embodiment, the multiple convolution arithmetic result data correspond to two convolution arithmetic result data. That is, the first comparator 104 compares a magnitude relation of the two convolution arithmetic result data, which are obtained from one arithmetic cycle in the convolution arithmetic portion 101. The first comparator 104 outputs data having a larger value of the two convolution arithmetic result data obtained from the first arithmetic cycle as the max convolution arithmetic result data to the memory circuit 105. The memory circuit 105 stores the max convolution arithmetic result data, which is output from the first comparator 104. The first comparator 104 outputs data having a larger value of the two convolution arithmetic result data obtained from the second arithmetic cycle as a max convolution arithmetic result data to the second comparator 106.

The second comparator 106 outputs data having the largest value of multiple max convolution arithmetic result data, which are obtained by the two arithmetic cycles, as a pooling arithmetic result data. In this embodiment, the multiple max convolution arithmetic result data correspond to four max convolution arithmetic result data. That is, the second comparator 106 compares a magnitude relation of the max convolution arithmetic result data and the max arithmetic result data stored in the memory circuit 105 when the second comparator 106 receives the max arithmetic result data from the first comparator 104. The second comparator 106 outputs a max convolution arithmetic result data having a larger value of the both max arithmetic result data to the activation processing portion 103 as a pooling arithmetic result data. Accordingly, the data having the largest value of the four convolution arithmetic result data obtained by the convolution arithmetic portion 101 by two arithmetic cycles is output as a pooling arithmetic result data. That is, before the activation processing portion 103 performs the activation processing, a processing result corresponding to a max pooling processing of 2×2 pixels is obtained.

The activation processing portion 103 executes a well-known activation processing to the pooling arithmetic result data, which is input from the second comparator 106. Incidentally, in this case, the activation processing by the activation processing portion 103 may use any function such as the logistic sigmoid function, the ReLU function, or the like. The activation processing by the activation processing portion 103 may use another nonlinear function.

Figure 5:
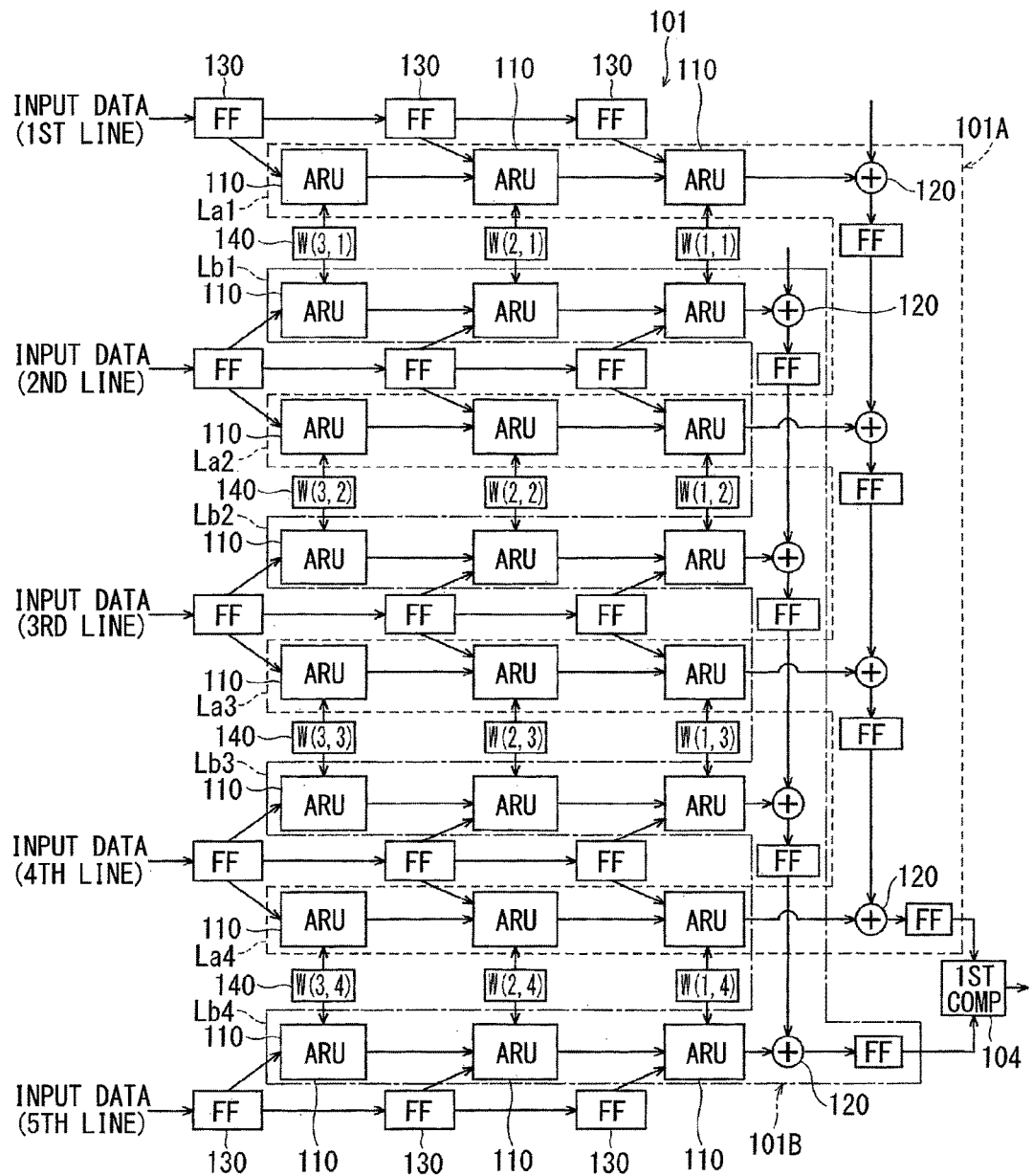
FIG. 5 is a block diagram schematically illustrating a configuration example of a convolution arithmetic portion.

A configuration of the convolution arithmetic portion 101 will be explained in more detail. As described in FIG. 5, in the systolic arrays 101A, 101B, multiple arithmetic units 110 having the identical configuration are connected mutually. In this case, the arithmetic units 110 are arranged in multiple layers from an input side receiving data from a previous layer to an output side outputting a convolution arithmetic result data. In the present embodiment, three layers of the arithmetic units 110 are arranged.

The systolic array 101A includes four arithmetic lines La1 to La4. Each of the four arithmetic lines La1 to La4 includes three layers of the arithmetic units 110. The systolic array 101B includes four arithmetic lines Lb1 to Lb4. Each of the four arithmetic lines Lb1 to Lb4 includes three layers of the arithmetic units 110. The systolic arrays 101A, 101B sequentially transfer an arithmetic result obtained by the arithmetic unit 110 in each layer in each of the arithmetic lines La1 to La4, Lb1 to Lb3 to the arithmetic unit positioned to an output side in each arithmetic cycle. The systolic arrays 101A, 101B perform the convolution arithmetic in parallel. The systolic array 101A adds the arithmetic result data obtained by each of the arithmetic lines La1 to La4 with an adder 120, and outputs the convolution arithmetic result data. The systolic array 101B adds the arithmetic result data obtained by each of the arithmetic lines Lb1 to Lb4 with an adder 120, and outputs the convolution arithmetic result data.

The arithmetic lines La1 to La4 of the systolic array 101A and the arithmetic lines Lb1 to Lb4 of the systolic array 101B are alternately arranged in the convolution arithmetic portion 101. The systolic array 101A and the systolic array 101B output the convolution arithmetic result data, which are different from each other. The arithmetic units 110 in each layer of the systolic arrays 101A, 101B receive a common input data that is input from a previous layer while a flip-flop circuit 130 adjusts timing. Incidentally, a flip-flop circuit is referred to as FF in the drawings. The systolic arrays 101A, 101B share the input data that is input from the preceding layer. In this present embodiment, data in the second to fourth line in the input data are commonly input to the arithmetic unit 110 in each layer. The arithmetic unit 110 in each layer of the systolic arrays 101A, 101B commonly receives a weight coefficient from the weight coefficient memory portion 140. The systolic arrays 101A, 101B shares the weight coefficient, which is used in convolution arithmetic. The flip-flop circuit 130 and the weight coefficient memory portion 140 are also arranged in multiple layers corresponding to the arithmetic unit 110 in each layer from the input side to the output side.

Figure 6:
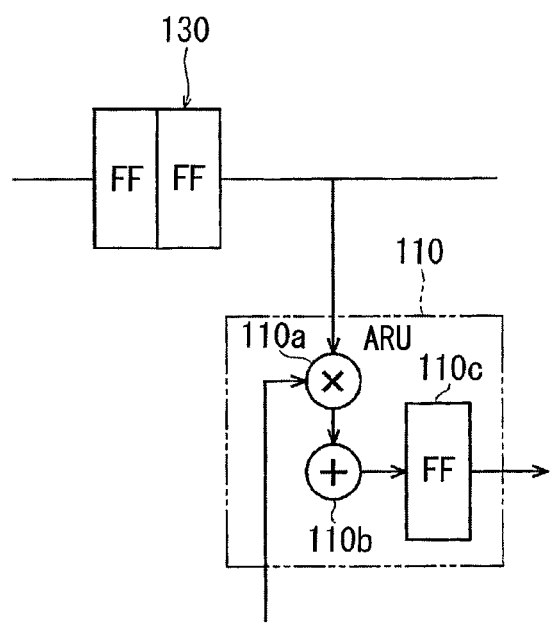
FIG. 6 is a block diagram illustrating a configuration example of an arithmetic unit.

As described in FIG. 6, the arithmetic unit 110 includes a multiplier 110a and an adder 110b. The multiplier 110a multiples the input data and the weight coefficient. The adder 110b adds the arithmetic result to the multiplier 110a. The arithmetic unit 110 outputs an arithmetic result data obtained by the adder 110b through the flip-flop circuit 110c. Incidentally, a configuration of the arithmetic unit 110 is not limited to this configuration.

As described in FIG. 7, the arithmetic processing in each layer in the arithmetic processing apparatus is performed in parallel. That is, in the first arithmetic cycle by the arithmetic processing apparatus, the systolic array 101A outputs a convolution arithmetic result data C (1, 1) and the systolic array 101B outputs a convolution arithmetic result data C (1, 2). The first comparator 104 outputs a data MAX (C (1, 1), C (1, 2)) having the largest value of the convolution arithmetic result data C (1, 1), C (1, 2) as a max convolution arithmetic result data M11.

In the second arithmetic cycle by the arithmetic processing apparatus 100, the memory circuit 105 stores the max convolution arithmetic result data M11. The systolic array 101A outputs a convolution arithmetic result data C (2, 1), and the systolic array 101B outputs a convolution arithmetic result data C (2, 2). The first comparator 104 outputs a data MAX (C (2, 1), C (2, 2)) having the largest value of the convolution arithmetic result data C (2, 1), C (2, 2) as a max convolution arithmetic result data M21. The second comparator 106 compares a magnitude relation of the max convolution arithmetic result data M11 stored in the memory circuit 105 and the max convolution arithmetic result data M21, and outputs a data MAX (M11, M21) having the largest value as a pooling arithmetic result data P11.

In the third arithmetic cycle by the arithmetic processing apparatus 100, the activation processing portion 103 receives the pooling arithmetic result data P11, and the pooling arithmetic result data P11 is activated. The systolic array 101A outputs a convolution arithmetic result data C (3, 1), and the systolic array 101B outputs a convolution arithmetic result data C (3, 2). The first comparator 104 outputs a data MAX (C (3, 1), C (3, 2)) having the largest value of the convolution arithmetic result data C (3, 1), C (3, 2) as a max convolution arithmetic result data M31.

In the fourth arithmetic cycle by the arithmetic processing apparatus 100, the memory circuit 105 stores the max convolution arithmetic result data M31. The systolic array 101A outputs a convolution arithmetic result data C (4, 1), and the systolic array 101B outputs a convolution arithmetic result data C (4, 2). The first comparator 104 outputs a data MAX (C (4, 1), C (4, 2)) having the largest value of the convolution arithmetic result data C (4, 1), C (4, 2) as a max convolution arithmetic result data M41. The second comparator 106 compares a magnitude relation of the max convolution arithmetic result data M31 stored in the memory circuit 105 and the max convolution arithmetic result data M41, and outputs a data MAX (M31, M41) being the largest value as a pooling arithmetic result data P31.

In the fifth arithmetic cycle by the arithmetic processing apparatus 100, the activation processing portion 103 receives the pooling arithmetic result data P31, and the pooling arithmetic result data P31 is activated. Thus, the arithmetic processing apparatus 100 performs a series of the arithmetic processing by the convolution arithmetic portion 101, the first comparator 104, the second comparator 106, and the activation processing portion 103 in parallel. In other words, the arithmetic processing apparatus 100 performs a series of the arithmetic processing in a pipeline system.

Figure 8:
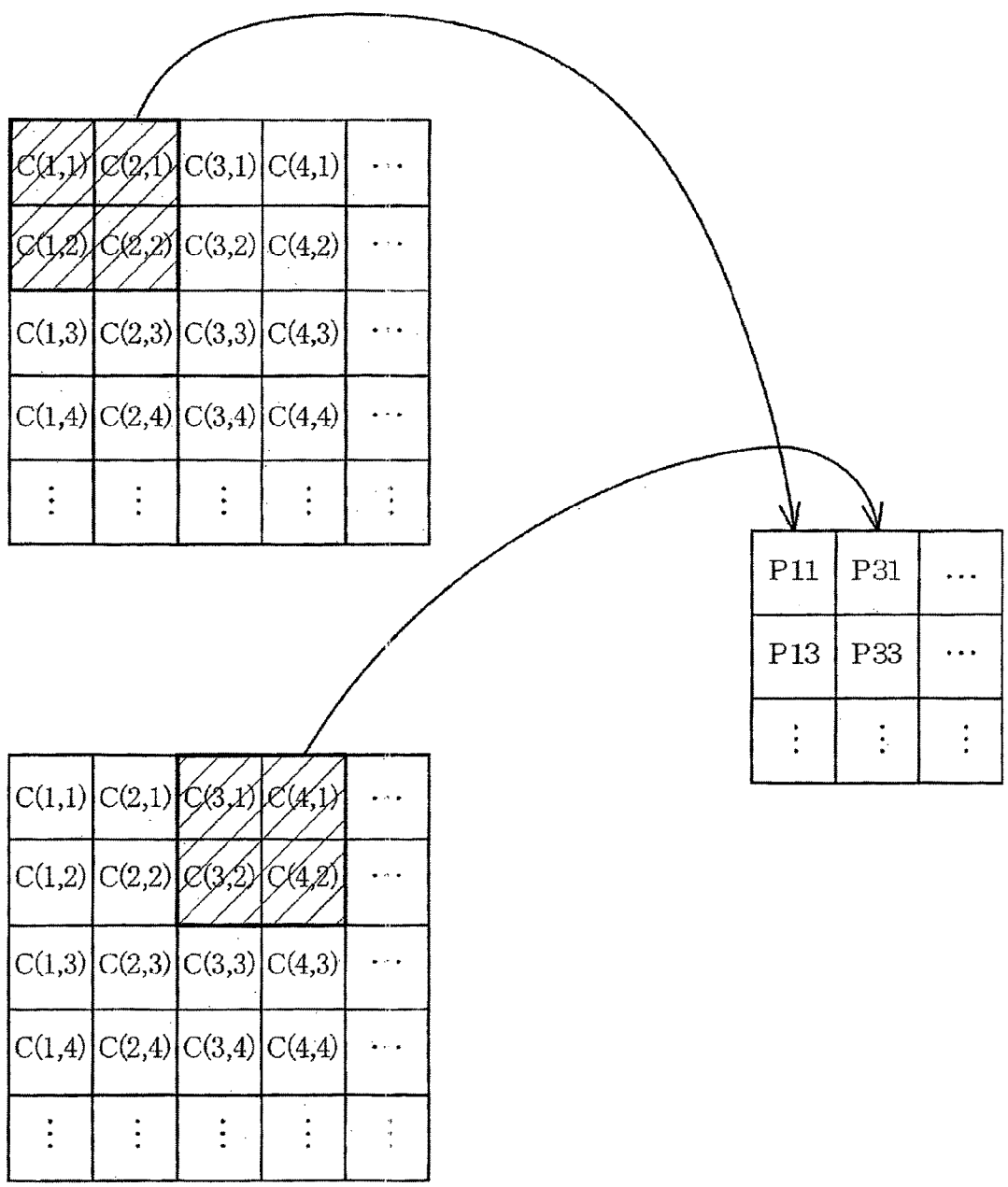
FIG. 8 is a diagram visually illustrating a flow of arithmetic processing by the arithmetic processing apparatus.

As described in FIG. 8, according to the above arithmetic processing, the largest convolution arithmetic result data of the four convolution arithmetic result data C (1, 1), C (1, 2), C (2, 1), and C (2, 2), for example, is output as a pooling arithmetic result data P11. The largest convolution arithmetic result data of the four convolution arithmetic result data C (3, 1), C (3, 2), C (4, 1), and C (4, 2), for example, is output as a pooling arithmetic result data P31. Thus, one pooling arithmetic result data is obtained from multiple convolution arithmetic result data, that is, the convolution arithmetic result data of 2×2 pixels in the present embodiment.

According to the arithmetic processing apparatus 100, the convolution arithmetic portion 101 executes convolution arithmetic to the input data input from a preceding layer and, in each arithmetic cycle, outputs two convolution arithmetic result data aligned in a perpendicular direction of all convolution arithmetic result data required for one pooling processing. The number of convolution arithmetic result data corresponds to four in the present embodiment. The first comparator 104 outputs a data having the largest value of the two convolution arithmetic result data obtained in one arithmetic cycle by the convolution arithmetic portion as the max convolution arithmetic result data. The second comparator 106 outputs a data having the largest value of the two max convolution arithmetic result data obtained by the first comparator 104 in two arithmetic cycles as the pooling arithmetic result data.

In a conventional art, one arithmetic cycle outputs all convolution arithmetic result data, which are required for one pooling processing. Instead, the number of the convolution arithmetic result data that the convolution arithmetic portion 101 outputs in one arithmetic cycle is reduced in the present embodiment. In addition, according to the comparison processing by the first comparator 104 and the second comparator 106, a processing result corresponding to the max pooling processing is obtained before the activation processing portion 103 executes the activation processing. According to this configuration, it may be possible to reduce a size of the convolution arithmetic portion 101 as compared with the conventional art. In addition, it may be sufficient to include one activation processing portion 103, and it may be possible to reduce the number of the activation processing portion 103 compared with the conventional art. Accordingly, it may be possible to reduce an entire circuit size of the arithmetic processing apparatus 100, which realizes the arithmetic processing by the convolutional neural network.

The systolic arrays 101A, 101B, which output the different convolution arithmetic result, are alternately aligned. The systolic arrays 101A, 101B share the input data input from a preceding layer and share the weight coefficient used in the convolution arithmetic. Accordingly, it may be possible to commonalize an overlapped portion between the systolic arrays 101A, 101B, and it may be possible to reduce a circuit size of the convolution arithmetic portion 101 and an entire circuit size of the arithmetic processing apparatus 100.

Second Embodiment

Figure 9:
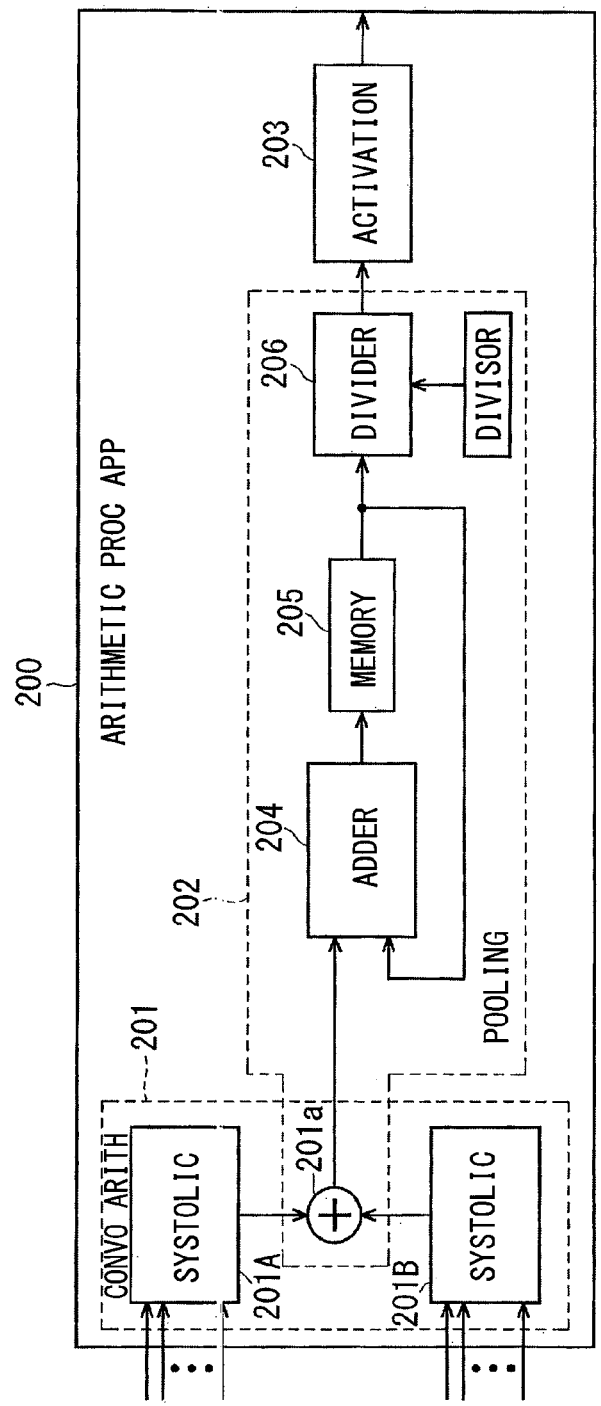
FIG. 9 is a block diagram schematically illustrating a configuration example of an arithmetic processing apparatus in a second embodiment.

An arithmetic processing apparatus 200 exemplified in FIG. 9 includes a convolution arithmetic portion 201, a pooling processing portion 202, an activation processing portion 203, or the like. The pooling processing portion 202 includes an adder 204, a memory circuit 205, a divider 206, or the like. The convolution arithmetic portion 201 includes multiple systolic arrays 201A, 201B. The systolic arrays 201A, 201B correspond to an example of the convolution arithmetic block. The convolution arithmetic portion 201 outputs a part of all convolution arithmetic result data required for one pooling processing in each arithmetic cycle. In this case, the convolution arithmetic portion 201 generates two of the four convolution arithmetic result data required for one pooling processing, adds the convolution arithmetic result data with the adder 201a, and outputs an addition data. Therefore, the convolution arithmetic portion 201 includes the two systolic arrays 201A, 201B. The adder 201a adds multiple convolution arithmetic result data obtained by the convolution arithmetic portion 201 in one arithmetic cycle to generate a first addition data, and outputs the first addition data. The multiple convolution arithmetic result data correspond to two convolution arithmetic result data in the present embodiment. The adder 201a corresponds to an example of the first adder, and is provided to the inside of the convolution arithmetic portion 201. The adder 201a configures a part of the pooling processing portion 202.

The adder 204 outputs a cumulative addition data that is obtained by cumulatively adding multiple first addition data obtained by multiple arithmetic cycles by the adder 201a. That is, when the adder 204 receives the first addition data from the adder 201a, the adder 204 adds the first addition data to the cumulative addition data stored in the memory circuit 205 and generates a new cumulative addition data. The adder 204 stores the newly generated cumulative addition data to the memory circuit 205. The adder 204 corresponds to an example of the second adder, and is provided to the outside of the convolution arithmetic portion 201. The memory circuit 205 outputs the stored cumulative addition data to the adder 204 and the divider 206.

The divider 206 outputs the cumulative addition data output from the adder 204 as the pooling arithmetic result data to the activation processing portion 203. The cumulative addition data output from the adder 204 corresponds to a data obtained by dividing the cumulative addition data input from the memory circuit 205 by a predetermined divisor D. The divisor D may be changed and set appropriately. In the present embodiment, the divisor D is set to four. Accordingly, the divider 206 outputs a data obtained by dividing the cumulative addition data input from the memory circuit 205 by four as the pooling arithmetic result data. That is, a processing result corresponding to the average pooling processing of four pixels, that is, 2×2 pixels is obtained before the activation processing portion 103 executes the activation processing. Incidentally, when it is aimed that the processing result corresponding to the average pooling processing of nine pixels, that is, 3×3 pixels is obtained, the divisor D is set to nine. That is, when the processing result corresponding to the average pooling processing of n×n pixels is obtained, the divisor D may be set to n^2. The symbol of n^2 means the square of n.

The activation processing portion 203 executes a well-known activation processing to the pooling arithmetic result data, which is input from the divider 206. Incidentally, in this case, the activation processing by the activation processing portion 203 may use a ReLU function.

Figure 10:
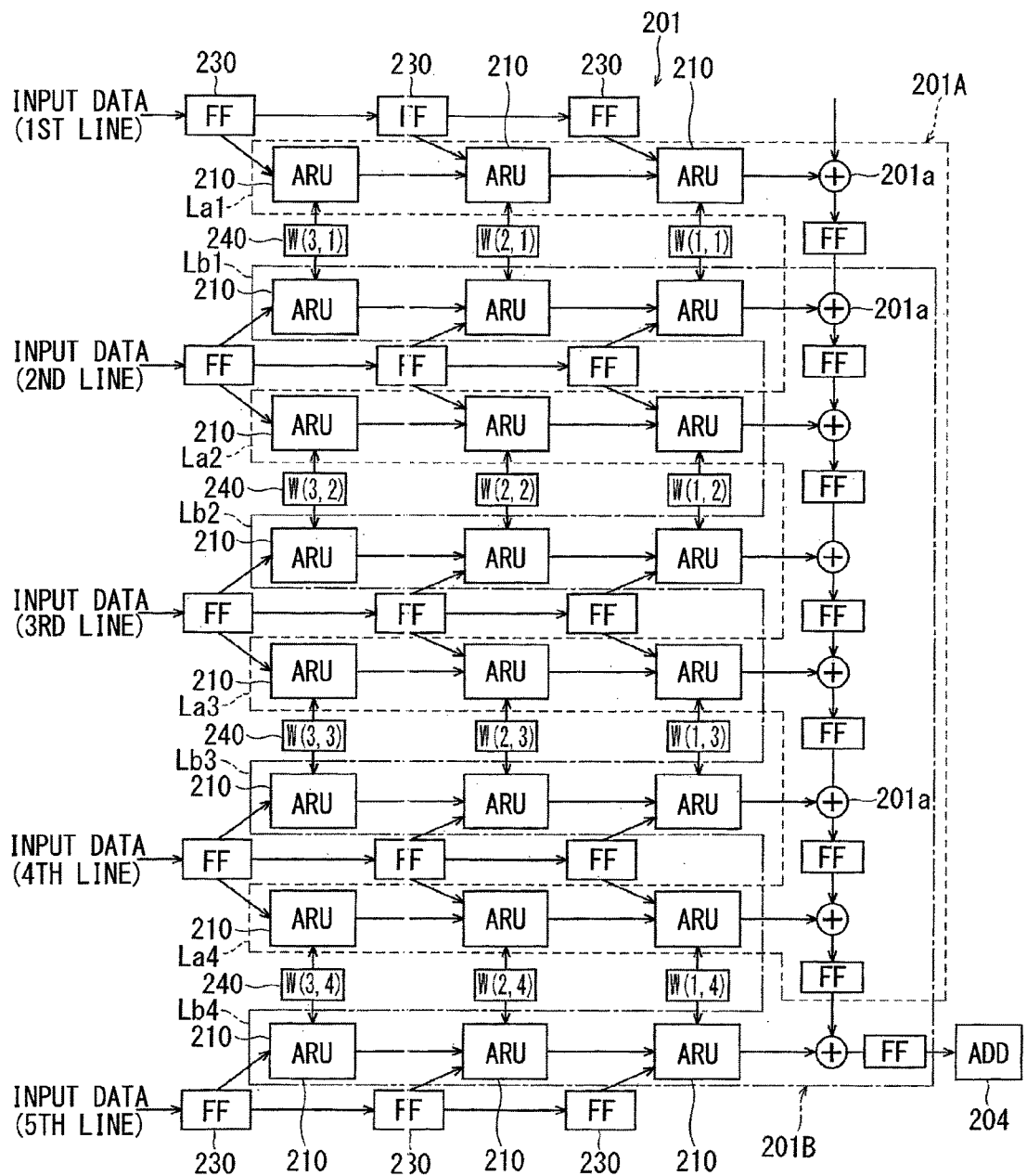
FIG. 10 is a block diagram schematically illustrating a configuration example of a convolution arithmetic portion in a second embodiment.

A configuration of the convolution arithmetic portion 201 will be explained in more detail. As described in FIG. 10, the convolution arithmetic portion 201 adds the convolution arithmetic result data obtained by each of the arithmetic lines La1 to La4 in the systolic array 201A and the convolution arithmetic result data obtained by each arithmetic line Lb1 to Lb4 in the systolic array 101B and generates the first addition data. The convolution arithmetic portion 201 outputs the first addition data to the adder 204. Incidentally, a configuration and an arrangement of an arithmetic unit 210, a flip-flop circuit 230, a weight coefficient memory portion 240, or the like are similar to the arithmetic unit 110, the flip-flop circuit 130, the weight coefficient memory portion 140, or the like in the first embodiment.

According to the arithmetic processing apparatus 200, the convolution arithmetic portion 201 executes convolution arithmetic to the input data input from a preceding layer, and outputs two convolution arithmetic result data aligned in a perpendicular direction of all convolution arithmetic result data required for one pooling processing in one arithmetic cycle. In the present embodiment, all arithmetic result data correspond to the four convolution arithmetic result data. The adder 201a adds multiple convolution arithmetic result data obtained by the convolution arithmetic portion 201 in one arithmetic cycle and outputs the first addition data. The adder 204 outputs a cumulative addition data that is obtained by cumulatively adding multiple first addition data obtained by the adder 201a in multiple arithmetic cycles. The divider 206 outputs a data obtained by dividing the cumulative addition data output from the adder 204 by the predetermined divisor D as the pooling arithmetic result data.

In a conventional art, one arithmetic cycle outputs all convolution arithmetic result data, which are required for one pooling processing. Instead, the number of the convolution arithmetic result data that the convolution arithmetic portion 201 outputs in one arithmetic cycle is reduced in the present embodiment. According to a combination of the addition processing by the adder 201a and the adder 204 and the division processing by the divider 206, a processing result corresponding to the average pooling processing is obtained before the activation processing portion 203 executes the activation processing. According to this configuration, it may be possible to reduce a size of the convolution arithmetic portion 201. In addition, it may be sufficient to include one activation processing portion 203, and it may be possible to reduce the number of the activation processing portion 203 as compared with the conventional art. Accordingly, it may be possible to reduce an entire circuit size of the arithmetic processing apparatus 200, which realizes the arithmetic processing by the convolutional neural network.

The systolic arrays 201A, 201B, which output the different convolution arithmetic result, are alternately aligned. The systolic arrays 201A, 201B share the input data input from a preceding layer and share the weight coefficient used in the convolution arithmetic. It may be possible to commonalize an overlapped portion in the systolic arrays 101A, 101B. It may be possible to reduce a circuit size of the convolution arithmetic portion 201 and an entire circuit size of the arithmetic processing apparatus 200.

Third Embodiment

Figure 11:
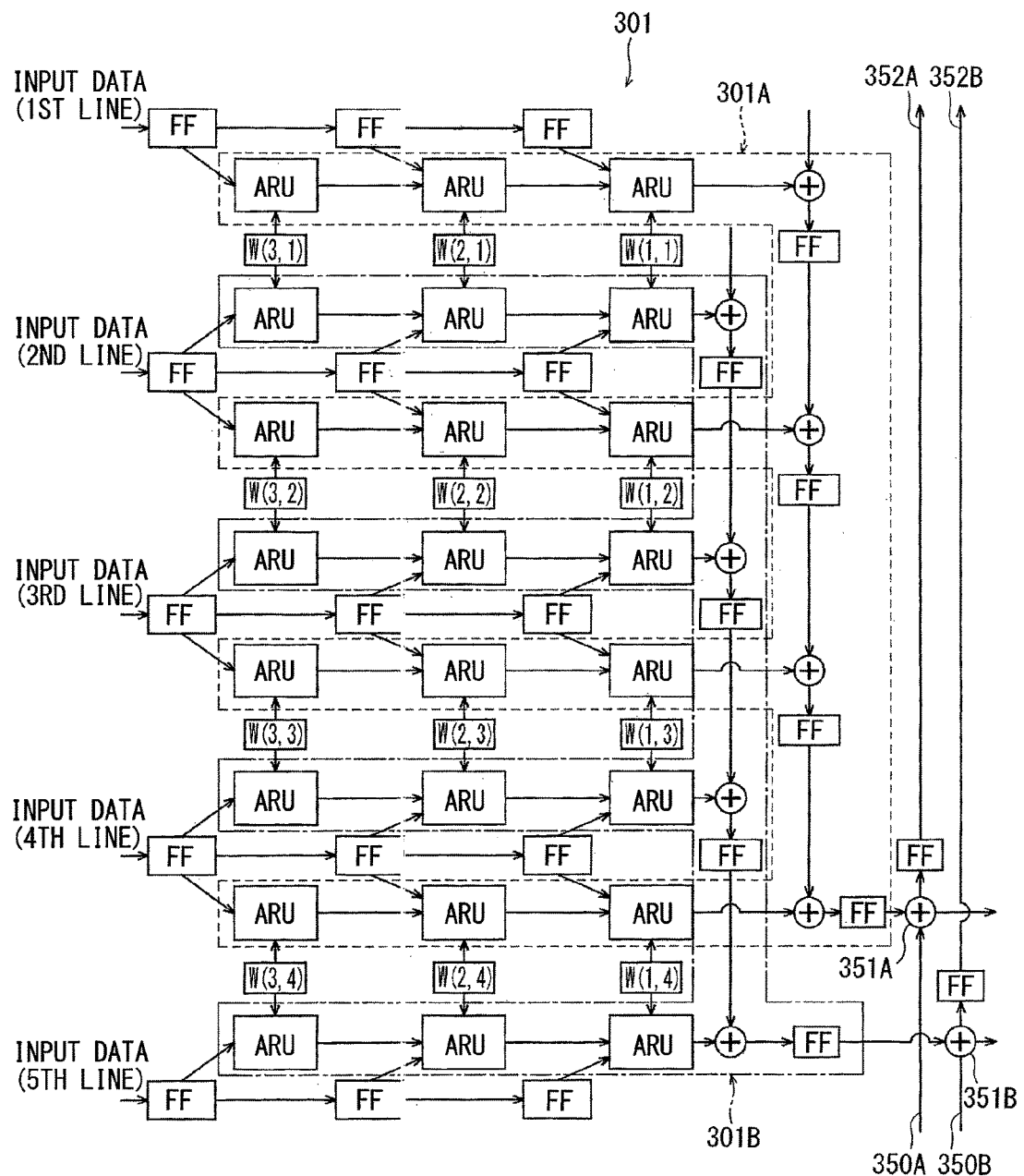
FIG. 11 is a block diagram schematically illustrating a configuration example of a convolution arithmetic portion in a third embodiment.

A convolution arithmetic portion 301 described in FIG. 11 corresponds to a configuration including an input paths 350A, 350B, adders 351A, 351B, and output paths 352A, 352B in addition to the convolution arithmetic portion 101.

The input path 350A inputs a data that a systolic array 301A included in another arithmetic processing apparatus (not shown) outputs to the adder 351A. The input path 350B inputs a data that a systolic array 301B included in another arithmetic processing apparatus (not shown) outputs to the adder 351B.

The adder 351A adds the data that the systolic array 301A included in the convolution arithmetic portion 301 outputs and the data input through the input path 350A. The adder 351A outputs the added data as a convolution arithmetic result data by the systolic array 301A to the pooling processing portion. The adder 351B adds the data that the systolic array 301B included in the convolution arithmetic portion 301 itself outputs and the data input through the input path 350B. The adder 351B outputs the added data as a convolution arithmetic result data by the systolic array 301B to the pooling processing portion.

The output path 352A outputs a data, which the adder 351A has added, to an adder 351A included in another arithmetic processing apparatus (not shown). The output path 352B outputs a data, which the adder 351B has added, to an adder 351B included in another arithmetic processing apparatus (not shown). The convolution arithmetic portion 301 outputs a data that the adder 351A has added and a data that the adder 351B has added to a pooling processing portion, as the convolution arithmetic result data.

According to this configuration, a convolution arithmetic result, that is, an extraction result of the feature quantity by another arithmetic processing apparatus may be also used for performing the extraction processing of the feature quantity. It may be possible to extract a higher-dimensional feature quantity while the arithmetic processing apparatus cooperates with another arithmetic processing apparatus.

Fourth Embodiment

Figure 12:
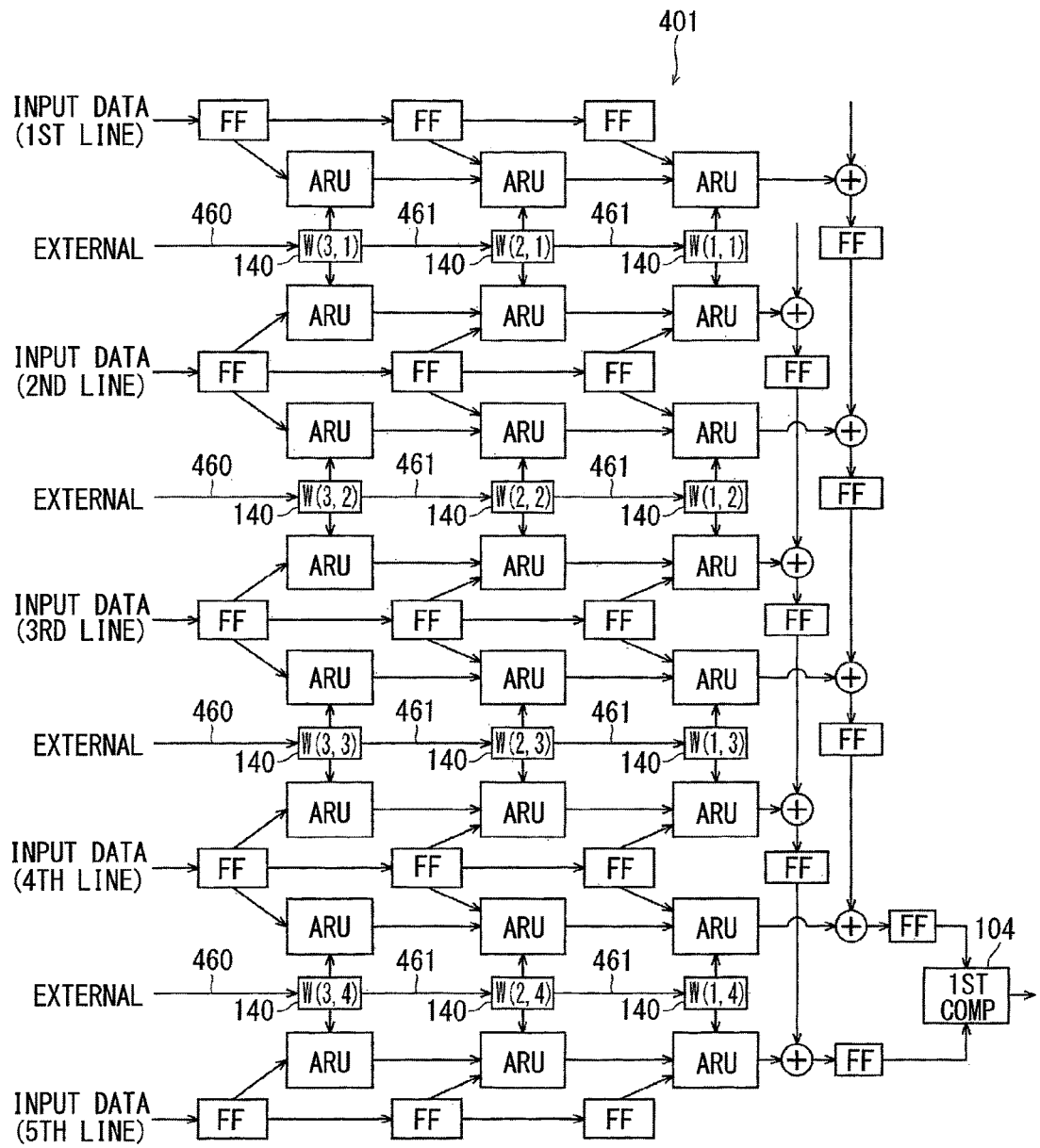
FIG. 12 is a block diagram schematically illustrating a configuration example of a convolution arithmetic portion in a fourth embodiment.

A convolution arithmetic portion 401 described in FIG. 12 corresponds to a configuration including a read path 460 and a transfer path 461 in addition to the convolution arithmetic portion 101. The read path 460 reads a data from the outside of the convolution arithmetic portion 401 into a weight coefficient memory portion 140 which is positioned to the closest to the input side (in other word, to the most upstream position). Incidentally, a supply source of the data that the weight coefficient memory portion 140 reads through the read path 460 exists outside the convolution arithmetic portion 401. For example, the supply source of the data may correspond to a memory existing inside or outside a chip of the arithmetic processing apparatus. The transfer path 461 sequentially transfers a data input to the weight coefficient memory portion 140 positioned to the closet to the input side to the weight coefficient memory portion 140 positioned to the output side.

When a weight coefficient stored in the weight coefficient memory portion 140 is edited, the weight coefficient memory portion 140 positioned to the closest to the input side initially reads a data for editing through the read path 460. The weight coefficient stored in the weight coefficient memory portion 140 positioned to the closest to the input side may be edited based on the data for editing. The data for editing, which is read in the weight coefficient memory portion 140 positioned to the closest to the input side, is sequentially transferred to the weight coefficient memory portion 140 in the output side through the transfer path 461. Accordingly, the weight coefficient stored in the weight coefficient memory portion 140 in the output side may be edited based on the data for editing. Incidentally, editing may correspond to initialization or rewriting of the weight coefficient stored in the weight coefficient memory portion 140.

Timing when the data for editing is sequentially transferred to the weight coefficient memory portion 140 in the output side may be adjusted to an arithmetic cycle in the convolution arithmetic portion 401. Accordingly, it may be possible to sequentially edit the weight coefficient while synchronizing with the arithmetic cycle in the convolution arithmetic portion 401.

When the weight coefficient stored in a specific weight coefficient memory portion 140 of multiple weight coefficient memory portions 140 aligned from the input side to the output side is edited, the data for editing may include identification information for specifying an address of the weight coefficient memory portion 140. In this case, the arithmetic processing apparatus may edit the weight coefficient stored in the specific weight coefficient memory portion 140 when the specific weight coefficient memory portion 140, which is specified by the identification information, receives the data for editing.

Other Embodiment

Incidentally, the present disclosure is not limited to the present embodiments. The present disclosure may include various embodiments within a scope being not deviated from the present disclosure. The present disclosure may be realized by combining with multiple embodiments. For example, a configuration exemplified in the third embodiment or in the fourth embodiment may be applied to the second embodiment.

According to one aspect of the present disclosure, an arithmetic processing apparatus includes a convolution arithmetic portion and a pooling processing portion. The convolution arithmetic portion receives an input data from a preceding one of multiple processing layers, performs convolution arithmetic to the input data, and, in each arithmetic cycle, outputs a part of all convolution arithmetic result data required for single pooling processing. The pooling processing portion performs pooling processing to the all convolution arithmetic result data required for single pooling processing, which are obtained by the convolution arithmetic portion, before executing activation processing.

Conventionally, one arithmetic cycle outputs all convolution arithmetic result data, which are required for one pooling processing. In the present disclosure, the number of the convolution arithmetic result data that the convolution arithmetic portion outputs in one arithmetic cycle is reduced. In addition, the pooling portion obtains a processing result by the pooling processing before executing the activation processing. According to this configuration, it may be possible to reduce a size of the convolution arithmetic portion. In addition, since the processing result by the pooling processing is obtained before executing the activation processing, it may be possible to reduce the number of the activation portions as compared with a conventional technology in which activation processing is performed to multiple data and then, the pooling processing is executed. Accordingly, it may be possible to reduce an entire circuit size of the arithmetic processing apparatus, which realizes the arithmetic processing by the convolutional neural network.

According to the arithmetic processing apparatus, the pooling processing may include a first comparator and a second comparator. The first comparator outputs a data having the largest value of the multiple convolution arithmetic result data obtained by the convolution arithmetic portion in one arithmetic cycle as a max convolution arithmetic result data. The second comparator outputs a data having the largest value of multiple max convolution arithmetic result data obtained by the first comparator in multiple arithmetic cycles as a pooling arithmetic result data.

According to this configuration, it may be possible to obtain a processing result corresponding to a max pooling processing by comparison processing with the first comparator and the second comparator before executing the activation processing without enlarging an entire circuit size of the arithmetic processing apparatus.

According to the arithmetic processing apparatus, the pooling processing portion may include a first adder, a second adder, and a divider. The first adder outputs a first addition data obtained by adding multiple convolution arithmetic result data obtained by the convolution arithmetic portion in one arithmetic cycle. The second adder outputs a cumulative addition data that is obtained by cumulatively adding multiple first addition data obtained by multiple arithmetic cycles by the first adder. The divider outputs a data obtained by dividing the cumulative addition data outputted from the second adder by a predetermined value as the pooling arithmetic result data.

According to this configuration, it may be possible to obtain the processing result corresponding to the average pooling processing by combining with the addition processing by the first adder and the second adder and the division processing by the divider before the activation processing without enlarging the entire circuit size of the arithmetic processing apparatus.

The arithmetic processing apparatus in the present disclosure may be configured from a microcomputer with a CPU, a ROM, a RAM, or the like. A memory device such as the RAM or the like may store a program describing operations executed by the convolution arithmetic portion, the pooling processing portion, and the activation processing portion. Each processing portion in the arithmetic processing apparatus may be configured from different designated devices (hardware).

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An arithmetic processing apparatus performing arithmetic by a neural network in which a plurality of processing layers are hierarchically connected, the arithmetic processing apparatus, which corresponds to one of the plurality of processing layers comprising:

a convolution arithmetic portion including at least two systolic arrays implemented as hardware, a flip flop circuit, and a weight coefficient memory, in which
the convolution arithmetic portion receives an image data from a preceding layer of the processing layers, executes convolution arithmetic with respect to the image data received, and outputs, in each arithmetic cycle, a part of convolution arithmetic result data required for a pooling processing at one time,
the at least two systolic arrays include a first systolic array and a second systolic array each having a first arithmetic line in which a plurality of product sum operators are connected in series, a second arithmetic line in which a plurality of product sum operators are connected in series, and a cumulative adder cumulatively adding arithmetic result data obtained from each of the first arithmetic line and the second arithmetic line, the at least two systolic arrays outputting a part of the convolution arithmetic result data which corresponds to an arrangement in a horizontal direction or a perpendicular direction of the image data, the first arithmetic line of the first systolic array, the first arithmetic line of the second systolic array, the second arithmetic line of the first systolic array and the second arithmetic line of the second systolic array are arranged in an order, the flip flop circuit inputs data received from the preceding layer while adjusting timing, each of the product sum operators includes a multiplier that multiplies the image data from the flip flop circuit and a weight coefficient from the weight coefficient memory and an adder that adds multiplication result, the weight coefficient memory provides, in common, a product sum operator of the first arithmetic line of the first systolic array and a product sum operator of the first arithmetic line of the second systolic array with the weight coefficient, wherein the first systolic array and the second systolic array share the weight coefficient in the weight coefficient memory, the flip flop circuit provides, in common, a product sum operator of the second arithmetic line of the first systolic array and a product sum operator of the first arithmetic line of the second systolic array with the input data, wherein the first systolic array and the second systolic array share the input data with timing adjusted by the flip flop circuit, whereby the input data and the weight coefficient are shared by the first systolic array and the second systolic array, each of the product sum operators of the at least two systolic array outputs the convolution arithmetic result data; and a pooling processing portion
including a first comparator, a memory circuit, and a second comparator, the first comparator and the second comparator being implemented as hardware, and performs the pooling processing on the convolution arithmetic result data output by the convolution arithmetic portion as a result of a plurality of arithmetic cycles, before executing activation processing, in the pooling processing:
the first comparator receives two convolution arithmetic result data outputted from the product sum operators of the at least two systolic arrays, outputs data having a larger value of the two convolution arithmetic result data as n-th max convolution arithmetic result data in a n-th arithmetic cycle to the memory circuit, and outputs data having a larger value of the two convolution arithmetic result data as a n+1-th max convolution arithmetic result data in a n+1-th arithmetic cycle to the second comparator, and the second comparator compares the n+1-th max arithmetic result data outputted from the first comparator at the n+1-th arithmetic cycle with the n-th max arithmetic convolution arithmetic result data stored in the memory circuit so as to output data having a larger value of the n+1-th max arithmetic result data and the n-th max arithmetic convolution arithmetic result data as a pooling arithmetic result data; and an activation processing circuit that activates the pooling arithmetic result data outputted by the second comparator, thereby the first comparator and the second comparator of the pooling processing provide the pooling arithmetic result data from the first and second systolic arrays, before activation processing by one of the activation processing circuit.

2. The arithmetic processing apparatus according to claim 1, wherein
the pooling processing portion includes:
a first adder outputting a first addition data obtained by adding a plurality of convolution arithmetic result data, which are obtained by the convolution arithmetic portion in a single arithmetic cycle;
a second adder outputting a cumulative addition data obtained by cumulatively adding a plurality of the first addition data, which are obtained by the first adder in a plurality of arithmetic cycles; and
a divider outputting the pooling arithmetic result data obtained by dividing the cumulative addition data output from the second adder by a predetermined value.

3. The arithmetic processing apparatus according to claim 1, wherein
the convolution arithmetic portion includes a plurality of convolution arithmetic blocks,
the plurality of convolution arithmetic blocks include different kinds of the plurality of convolution arithmetic blocks,
the different kinds of the plurality of convolution arithmetic blocks are arranged alternately, and
the plurality of convolution arithmetic blocks shares the input data that is input from the other of the plurality of processing layers and shares a weight coefficient used in the convolution arithmetic.

4. The arithmetic processing apparatus according to claim 3, wherein
the convolution arithmetic portion includes:
an input path receiving a data that is output from a convolution arithmetic block in an other arithmetic processing apparatus;
an adder adding a data that is output from one of the plurality of convolution arithmetic blocks in the arithmetic processing apparatus and the data received through the input path and generating a convolution arithmetic result data; and
an output path outputting the convolution arithmetic result data added by the adder to an other arithmetic processing apparatus.

5. The arithmetic processing apparatus according to claim 3, wherein
the convolution arithmetic portion includes a plurality of weight coefficient memories storing a plurality of weight coefficients used in convolution arithmetic,
the plurality of weight coefficient memories are arranged from an input side that receives the input data from the other of the plurality of processing layers to an output side that outputs a convolution arithmetic result data, and
the arithmetic processing apparatus further comprises:

a read path receiving a data from an portion outside the arithmetic processing apparatus and providing the data to one of the plurality of weight coefficient memories, which is positioned closest to the input side among the plurality of weight coefficient memories; and a transfer path transmitting the data that has input to the one of the plurality of weight coefficient memories to an other of the plurality of weight coefficient memories positioned to the output side from the one of the plurality of weight coefficient memories.

6. The arithmetic processing apparatus according to claim 2, wherein the convolution arithmetic portion includes a plurality of convolution arithmetic blocks, the plurality of convolution arithmetic blocks include different kinds of the plurality of convolution arithmetic blocks, the different kinds of the plurality of convolution arithmetic blocks are arranged alternately, and the plurality of convolution arithmetic blocks shares the input data that is input from the other of the plurality of processing layers and shares a weight coefficient used in the convolution arithmetic.

7. The arithmetic processing apparatus according to claim 6, wherein the convolution arithmetic portion includes:

an input path receiving a data that is output from a convolution arithmetic block in an other arithmetic processing apparatus;

an adder adding a data that is output from one of the plurality of convolution arithmetic blocks in the arithmetic processing apparatus and the data received through the input path and generating a convolution arithmetic result data; and an output path outputting the convolution arithmetic result data added by the adder to an other arithmetic processing apparatus.

8. The arithmetic processing apparatus according to claim 6, wherein the convolution arithmetic portion includes a plurality of weight coefficient memories storing a plurality of weight coefficients used in convolution arithmetic, the plurality of weight coefficient memories are arranged from an input side that receives the input data from the other of the plurality of processing layers to an output side that outputs a convolution arithmetic result data, and the arithmetic processing apparatus further comprises:

a read path receiving a data from an portion outside the arithmetic processing apparatus and providing the data to one of the plurality of weight coefficient memories, which is positioned closest to the input side among the plurality of weight coefficient memories; and a transfer path transmitting the data that has input to the one of the plurality of weight coefficient memories to an other of the plurality of weight coefficient memories positioned to the output side from the one of the plurality of weight coefficient memories.

* * * * *